(12) United States Patent
Bostwick et al.

(10) Patent No.: US 10,316,795 B2
(45) Date of Patent: *Jun. 11, 2019

(54) LIQUID OXYGEN-PROPYLENE ROCKET INJECTOR

(71) Applicant: Vector Launch Inc., Tucson, AZ (US)

(72) Inventors: Christopher Bostwick, Long Beach, CA (US); John Garvey, Long Beach, CA (US); Christopher Anderson, San Marcos, CA (US); Eric Besnard, Long Beach, CA (US)

(73) Assignee: Vector Launch Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/101,000

(22) Filed: Aug. 10, 2018

(65) Prior Publication Data

US 2019/0063371 A1 Feb. 28, 2019

Related U.S. Application Data

(63) Continuation of application No. 15/285,324, filed on Oct. 4, 2016, now Pat. No. 10,072,612.

(Continued)

(51) Int. Cl.
*F02K 9/52* (2006.01)
*B33Y 10/00* (2015.01)
(Continued)

(52) U.S. Cl.
CPC ............. *F02K 9/52* (2013.01); *B22F 3/008* (2013.01); *B22F 3/1055* (2013.01); *B33Y 10/00* (2014.12);
(Continued)

(58) Field of Classification Search
CPC ..... F02K 9/44; F02K 9/50; F02K 9/52; F02K 9/54; F02K 9/566
See application file for complete search history.

(56) References Cited

U.S. PATENT DOCUMENTS

| 2,753,687 A | 7/1956 | Wissley et al. |
| 2,982,097 A * | 5/1961 | Hull .......................... F02K 9/52 60/258 |

(Continued)

FOREIGN PATENT DOCUMENTS

WO 2013/187936 A1 12/2013

OTHER PUBLICATIONS

Garvey, John M. et al., "LOX-Propylene Propulsion Testing For A Nanosat Launch Vehicle," 41st AIAA/ASME/SAE/ASEE Joint Propulsion Conference & Exhibit, 13 pages, Jul. 10-13, 2005.

(Continued)

*Primary Examiner* — Lorne E Meade

(57) ABSTRACT

Provided herein are various improvements to rocket engine components and rocket engine operational techniques. In one example, a rocket engine propellant injection apparatus is provided that includes a manifold formed into a single body by an additive manufacturing process and comprising a fuel cavity and an oxidizer cavity. The manifold also includes one or more propellant feed stubs, the one or more propellant feed stubs protruding from the manifold and formed into the single body of the manifold by the additive manufacturing process, with at least a first stub configured to carry fuel to the fuel cavity and at least a second stub configured to carry oxidizer to the oxidizer cavity. The manifold also includes a plurality of injection features formed by apertures in a face of the manifold, ones of the plurality of injection features configured to inject the fuel and the oxidizer for combustion.

22 Claims, 7 Drawing Sheets

Related U.S. Application Data

(60) Provisional application No. 62/237,126, filed on Oct. 5, 2015.

(51) Int. Cl.
*B33Y 80/00* (2015.01)
*B22F 3/00* (2006.01)
*F02K 9/56* (2006.01)
*B22F 3/105* (2006.01)

(52) U.S. Cl.
CPC .............. *B33Y 80/00* (2014.12); *F02K 9/566* (2013.01); *F05D 2230/31* (2013.01); *Y02P 10/295* (2015.11)

(56) References Cited

U.S. PATENT DOCUMENTS

| | | | |
|---|---|---|---|
| 3,000,184 A | | 9/1961 | Fish |
| 3,075,793 A | * | 1/1963 | Lennon ................. F16L 19/103 285/342 |
| 3,358,455 A | | 12/1967 | Hunt |
| 5,265,415 A | | 11/1993 | Cox, Jr. |
| 5,417,049 A | | 5/1995 | Sackheim et al. |
| 6,272,847 B1 | | 8/2001 | Dietrich |
| 6,351,939 B1 | | 3/2002 | Buddenbohm et al. |
| 8,858,224 B2 | | 10/2014 | Mungas et al. |
| 10,072,612 B2 | * | 9/2018 | Bostwick ............... B33Y 10/00 |
| 2011/0219743 A1 | | 9/2011 | Johnson et al. |
| 2012/0060468 A1 | | 3/2012 | Dushku et al. |
| 2013/0160426 A1 | | 6/2013 | Johnson et al. |
| 2015/0240746 A1 | | 8/2015 | Zhang et al. |
| 2017/0096967 A1 | | 4/2017 | Bostwick et al. |

OTHER PUBLICATIONS

Halterman, TE, "3D Printed Rocket Engine Project Goes To The Next Level With Ignus Engine & Kickstarter," 3DR Holdings, LLC, 5 pages, Apr. 22, 2015.

Hartman, Anthony T. et al., "Design And Analysis Of A CMC Radiation Cooled LOX/Densified Propylene Engine," 47th AIAA/ASME/SAE/ASEE Joint Propulsion Conference & Exhibit, 14 pages, Jul. 31-Aug. 3, 2011.

International Application No. PCT/US2016/055423, International Search Report & Written Opinion, 12 pages, Jan. 9, 2017.

Kitsche, Wolfgang, "Chapter 4—Engine Test," Operation Of A Cryogenic Rocket Engine, 16 pages, 2011.

Pilkey, Walter D. et al., "Chapter 3—Shoulder Fillets," Peterson's Stress Concentration Factors, Third Edition, 43 pages, 2008.

Rocket Moonlighting, "Testing The New Chambers," https://web.archive.org/web/20131230234811/http://rocketmoonlighting.blogspot.com/, 5 pages, Nov. 27, 2013.

Rocket Moonlighting, "The 'Open' Part," http://rocketmoonlighting.blogspot.com/2012/, 9 pages, Oct. 2, 2012.

Rocket Moonlighting, "What Its All About," http://rocketmoonlighting.blogspot.com/2012/03/what-its-all-about.html, 4 pages, Mar. 4, 2011.

Swagelok, "Medium- and High-Pressure Fittings, Tubing, Valves, And Accessories," Parts Catalog MS-02-472, Rev. E, pp. 1046-1172, downloaded May 28, 2017.

Zhang, Teddy et al., "3D Printing: A Cost Effective And Timely Approach To Manufacturing Of Low-Thrust Engines," 50th AIAA/ASME/SAE/ASEE Joint Propulsion Conference, 23 pages, Jul. 28-30, 2014.

\* cited by examiner

LIQUID OXYGEN-PROPYLENE ROCKET INJECTOR

RELATED APPLICATIONS

This application is a continuation of, and claims priority to, U.S. patent application Ser. No. 15/285,324 (now U.S. Pat. No. 10,072,612), entitled "ENHANCED LIQUID OXYGEN-PROPYLENE ROCKET ENGINE," and filed Oct. 4, 2016. This application also hereby claims the benefit of and priority to U.S. Provisional Patent Application 62/237,126, titled "LIQUID OXYGEN PROPYLENE ENGINE AND IMPROVEMENTS THEREOF," filed Oct. 5, 2015, which is hereby incorporated by reference in its entirety.

This invention was made with the United States Government under contracts awarded by NASA. The Government has certain rights in this invention.

TECHNICAL BACKGROUND

Rocket systems can employ different engines and engine types that reflect the particular mission launch requirements as well as the types of payloads expected. In liquid-fueled engine configurations, fuel and oxidizer types can be selected according to energy needs, specific impulse characteristics, and other factors. However, the design and components used for rocket engines can vary considerably based upon the fuel and oxidizer selections. These components can include propellant tanks, feed lines, pumps, propellant injection components, and combustion chambers, among other components.

One example of a propellant configuration includes liquid oxygen (LOX)/propylene. LOX/propylene can provide potential performance greater than many other propellant combinations in terms of higher specific impulse and density due in part to the carbon double bond in propylene (a.k.a. propene) and the energy release associated with oxidation. Historically, LOX/propylene has not been a popular propellant in rocket engines, somewhat due to technical challenges with this propellant mix, as well as past industry infrastructure selections of other propellants that include hydrogen/LOX, rocket propellant-1 (RP-1)/LOX, LOX/methane, and various solid rocket propellants or hypergolic rocket propellants. However, various difficulties arise when using liquid propellants, such as injector erosion, chamber heat build-up, and potential for leaks in couplings and connections among the various piping and components of the engines.

Overview

Provided herein are various improvements to rocket engine components and rocket engine operational techniques. In one example, a rocket engine propellant injection apparatus is provided that includes a manifold formed into a single body by an additive manufacturing process and comprising a fuel cavity and an oxidizer cavity. The manifold also includes one or more propellant feed stubs, the one or more propellant feed stubs protruding from the manifold and formed into the single body of the manifold by the additive manufacturing process, with at least a first stub configured to carry fuel to the fuel cavity and at least a second stub configured to carry oxidizer to the oxidizer cavity. The manifold also includes a plurality of injection features formed by apertures in a face of the manifold, ones of the plurality of injection features configured to inject the fuel and the oxidizer for combustion.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
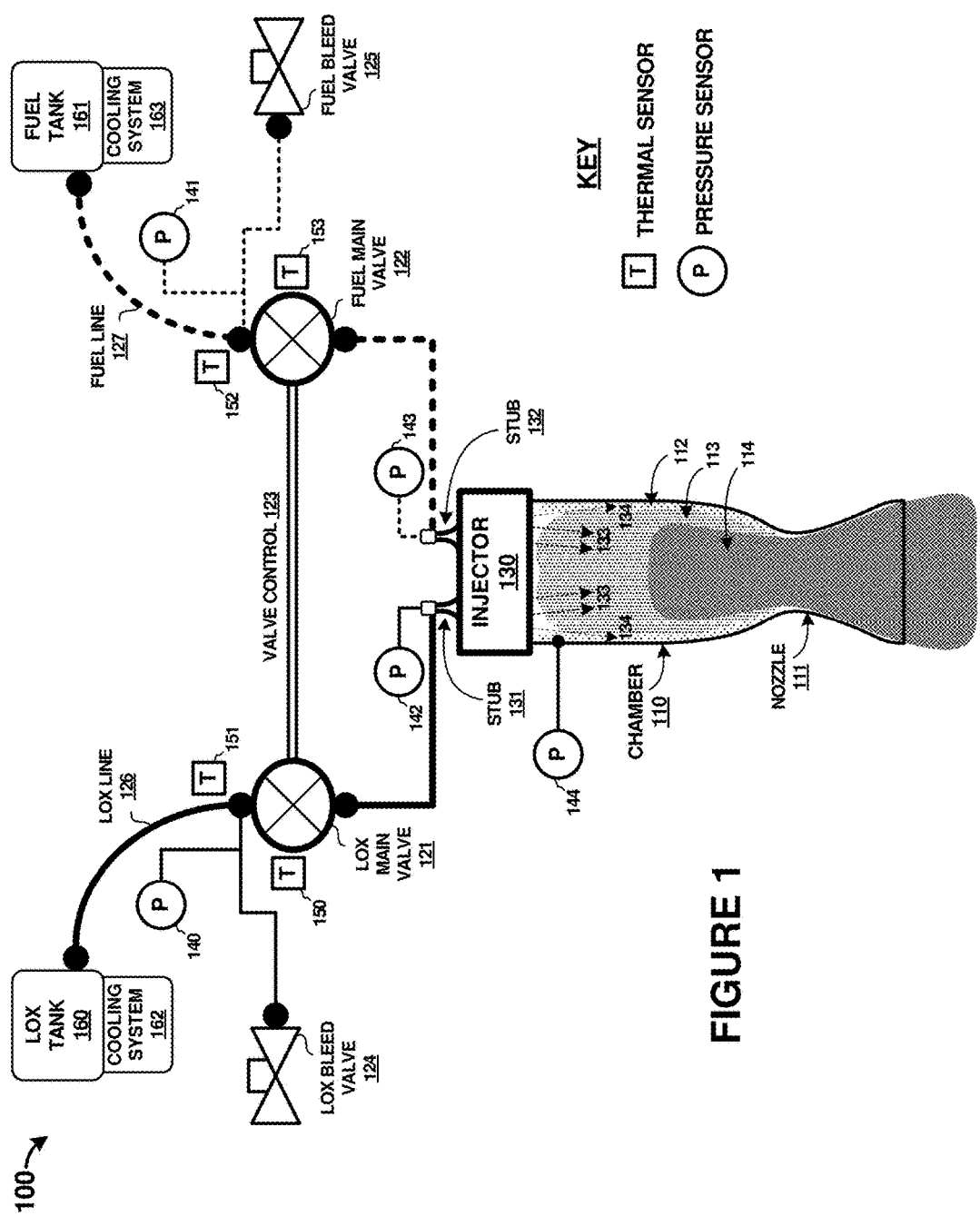
FIG. 1 illustrates a rocket engine system in an implementation.

Liquid rocket propellants can be employed in various rocket engines. These rocket engines can have propellants selected based on various factors, such as payload, mission profiles, or other factors. However, typical rocket engines are designed with particular propellants in mind which drives selection of components, materials, and other elements to support the selected propellants. The examples herein relate generally to rocket engines that employ a propellant combination of liquid oxygen (LOX)/propylene. However, the various examples herein can include improvements for use in any suitable rocket engine that employs other propellants. These improvements can provide increased engine component survivability and increased operational pressure range of the engines.

As mentioned above, LOX/propylene rocket engines provide improved launch vehicle liquid rocket engine performance potential over many other propellant types. This improved performance potential is derived in part from the carbon double bond in propylene molecules and increased energy release associated with oxidation. However, the use of propylene with a carbon double bond and increased energy release typically makes the combustion process more sensitive to off-nominal operating conditions. This is especially true during start-up transients when the LOX and propylene are transitioning between gaseous and liquid phases and at low chamber pressures during steady-state operation. As a result, the injectors typically are more sensitive to damage during start-up than are engines using more standard hydrocarbon liquid fuels such as RP-1, ethanol, or supercritical fuels like hydrogen or methane.

Conventional LOX/propylene engines were initially developed for use with liquid propylene at ambient temperatures. This resulted with ranges of propellant input pressures that were initially constrained to minimize the potential for off-nominal combustion during steady-state operation. To mitigate risk during start-up transients, the engine designs incorporated small wetted volumes downstream of the main valve(s) to reduce the start-up transient. Additionally, the high vapor pressure of the propylene and the cryogenic temperature of LOX during start-up caused the initial flows into the injector assembly to be a complex and dynamic multi-phase process. Both propellants first gasify while the injector elements cool down and manifold and chamber pressures rise. During this transient period, critical parameters such as combustion temperature, injector face cooling, and chamber film cooling flow rates are more sensitive to exceeding acceptable operating ranges if boundary conditions are off-nominal due in part of the propylene high-energy carbon double bond noted previously. Gas bubbles also generally form in the propylene feed lines ahead of the injector main valves during terminal count, which in turn extends the initial gas flow phase at start up and increases the heating rates of the injector surface.

Furthermore, if the engine were to run at chamber pressures below the vapor pressure of the propylene during steady-state combustion, cavitation within the injector manifold and flow passages generally restrict the mass flow and inducing severe off-nominal combustion behavior. This is relevant to applications featuring blow-down tank pressurization systems, such as launch vehicle upper stages, which can significantly reduce engine performance and lead to damage of the engine injector and/or the chamber. Historically, the length of the feed lines from the propellant tanks for both LOX and propylene were both kept to a minimum to ensure the propellants sitting in the feed system tubes (with greater local heat flux/vaporization) did not experience excessive local heating and gasification.

While acceptable for development testing, such feed line configurations would not be feasible for engine assemblies that need to include thrust vector control (TVC) capabilities. As a result, these conventional LOX/propylene engines proved to be more sensitive to start-up conditions and prone to damage, principally due to injector melting. Constraints on low-end chamber pressures also inhibited several candidate applications, most notably high performance nanosat launch vehicle upper stages. The challenges of incorporating TVC due to the minimal feed line lengths limited also has limited launch system applications. Additionally, high energy combustion in a LOX/propylene rocket can damage walls of the combustion chamber when the reacting propellants come in contact with the walls. This damage can reduce the lifespan of the engine or lead to catastrophic failure of the engine.

The examples herein include improvements for LOX/propylene liquid rocket engines to promote engine component longevity, especially during start-up transients, in order to ensure high energy release inherent in propylene combustion while expanding the operational pressure range. The design modifications and improvements discussed herein can include injector design modifications, improvements in propellant feed line configurations, and pre-conditioning techniques for densification of the propylene and lowering of the propylene temperature. This densification and temperature lowering can reduce a duration of the gas-to-liquid transition during start-up and provide sufficient cooling to the injector components before overheating. The LOX/propylene engine examples herein also can include improved sealing mechanisms between injector elements to accommodate the lower injector temperatures resulting from densified propylene.

As a first example of an improved rocket engine, FIG. 1 is presented. FIG. 1 is a system diagram illustrating engine system 100, which is an example LOX/propylene engine. Engine system 100 includes combustion chamber 110 fed by injector assembly 130. Engine system 100 also includes propellant feed lines 126-127 that deliver propellant to associated valves 121-122 from propellant tanks 160-161. Although not shown in FIG. 1 for clarity, the rocket engine system can also include further propellant tanks, ignition systems, structural elements, chassis elements, electronic control systems, and other elements to form a functional rocket. At least two tanks are indicated in FIG. 1, namely a fuel tank configured to contain liquid propylene fuel and an oxidizer tank configured to contain LOX.

In operation, cryogenic propellants contained in associated fuel and oxidizer tanks are provided through associated propellant lines 126-127 to main valves 121-122. LOX tank 160 is configured to store liquid oxygen in a cryogenic state prior to ignition of engine system 100, and fuel tank 161 is configured to store liquid propylene in a densified state prior to the ignition of engine system 100. Main valves 121-122 allow transfer of the propellants to respective stubs 131-132 of injector assembly 130. Injector assembly 130 then introduces the propellants into chamber 110 for combustion and reactive exit through nozzle 111. An associated rocket or other flight vehicle is propelled by the transfer of momentum between the propellant to the vehicle. However, FIG. 1 includes several features that provide for enhanced performance. These include propellant bleed valves 124-125, injector assembly 130 with integral stubs 131-132, and preconditioned fuel techniques.

A plurality of sensors 140-143 and 150-153 are included, such as the pressure and temperature sensors indicated in FIG. 1. These sensors monitor associated characteristics and performance of the elements of rocket system 100 and can transfer information related to the monitored elements to a control system comprising various electronics, electromechanical elements, hydraulics, and/or circuitry. The sensors can comprise transducers, electrical sensors, electromechanical sensors, and other sensor types. Various communication electronics can be included in the sensors to deliver monitored data and information to an associated control system. Although pressure and temperature sensors are shown in FIG. 1, it should be understood that further sensor types can be employed, such as vibration sensors, acoustic sensors, optical sensors, stress/strain sensors, and various video or audio monitoring systems.

To control flow of propellant to injector assembly 130 and chamber 110, such as the LOX and propylene propellants, valves 121-122 are included. These valves can share a common valve control 123, or can be separately controlled. In some examples, valves 121-122 are associated with propellant pumps or pumping mechanisms. When valves 121-122 are opening, then propellant can flow from the associated propellant lines into injector assembly 130. Valves 121-122 and 124-125 can comprise any valve type and material suitable for use in a rocket engine environment and for handling cryogenic fuels, such as ball valves, butterfly valves, needle valves, or others, including combinations thereof.

Propellant bleed valves 124-125 are also included which allow an operator to evacuate fluid, such as vaporized propellant, from the various associated fuel lines. Gas or vapor content can arise in propellant lines due to warming of cryogenic fluids from the environment, materials of the propellant lines, or pressure differences, or other warming events and causes. This gas or vapor content can damage elements of system 100, especially during start-up events. Bleed valves 124-125 are positioned at propellant inlets of engine system 100. Bleed valves 124-125 may be manually-operated or remotely operated valves mounted to the engine and interface just upstream of the primary seal of the main valves. Bleed valves 124-125 may comprise electronically, hydraulically, or pneumatically-actuated valves. Bleed valves 124-125 assist in usage of preconditioned propellant to reduce or eliminate gas content in propellant lines during start-up when the propellant flows into the injector. A propellant feed system that employs these bleed valves can ensure cold propellant at the inlet to main valves 121-122, and enable longer and more complex feed systems. For example, longer propellant lines for both fuel and oxidizer can be employed without increasing the risk of damage during engine start-up while making the engine compatible with thrust vector control elements.

Both LOX and propylene propellants can be contained in the associated propellant tanks 160-161 at cryogenic temperatures, and cooling systems 162-163 employed by system 100 can include associated insulation, chiller mechanisms, recirculation features, heat exchangers, or other elements. Preconditioning of the propylene or LOX can include a densification processes that cools the propellants below a desired temperature. The fuel may comprise densified propylene which has been cooled below ambient temperature (such as below 25° C.), or subcooled below the propylene atmospheric boiling point (below −50° C.). The densified propylene may be cooled prior to transfer to combustion chamber 110 while in or recirculating through the associated fuel tank, or may be cooled prior to loading into the associated tank.

Advantageously, system 100 can provide an improved LOX/propylene-based rocket engine that ensures high energy release with propylene combustion while preventing damage to the engine components due to preconditioned or densified and cooled propellants. Rocket system 100 can use a densified propylene subcooled to cryogenic temperatures with an enhanced injector assembly 130 and associated bleed valves. These enhanced features significantly reduce the vapor pressure of this fuel, thereby minimizing start-up transients and expanding the safe operating range for engine pressures. Example launch systems that incorporate rocket system 100 can include a two-stage configuration of a nanosat launch vehicle (NLV) that can provide dedicated, cost-effective launch services to low Earth orbit (LEO) for the emerging "cubesat" and "nanosat" platforms. Dedicated launch systems can include system 100 and thus avoid reliance as secondary payload opportunities aboard much larger launch systems, which place very significant constraints on schedule, achievable orbits and spacecraft design.

Figure 2A:
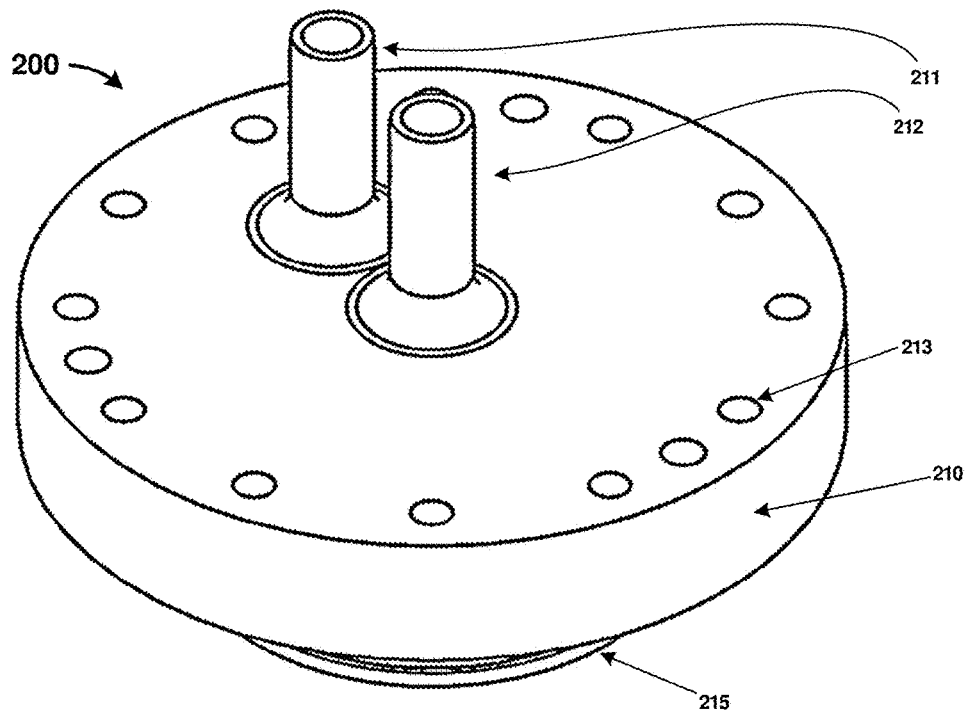
FIG. 2A illustrates an injector manifold in an implementation.
Figure 2B:
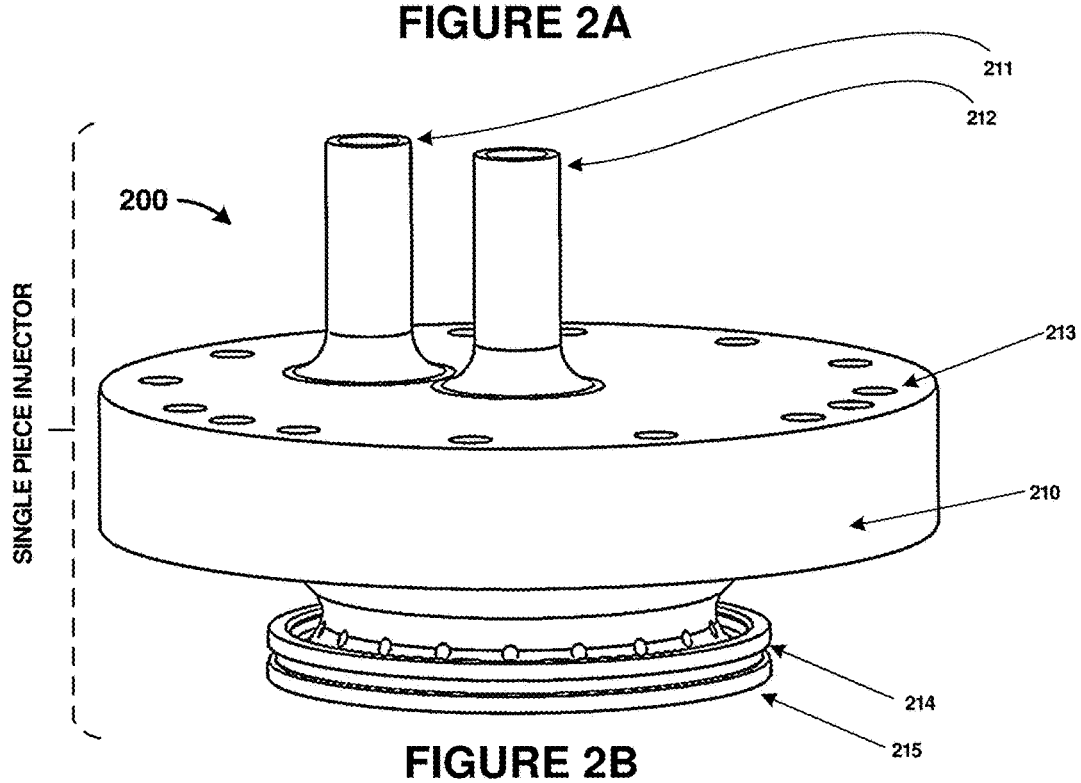
FIG. 2B illustrates an injector manifold in an implementation.

In FIG. 1, injector assembly 130 comprises an enhanced injector element for use with densified propylene and LOX propellants. As a first example of injector assembly 130, FIGS. 2A and 2B are provided. FIG. 2A includes an isometric view focusing on a 'top' of injector 200. FIG. 2B includes an isometric view focusing on a 'side' of injector 200. Injector 200 includes injector body or manifold 210, propellant tube stubs or stems 211-212, mounting features 213, injector seal feature 214 and injection face 215. In operation, propellant is provided to associated stubs 211-212 from propellant lines (such as seen in FIG. 1). Cavities within injector manifold 210 route the propellant to associated apertures formed into injection face 215. One or more gaskets can be included in injector seal feature 214 to provide a sealed mating between injector 200 and an associated combustion chamber or other engine elements.

Injector 200 can be formed using a manufacturing process that includes additive manufacturing. Additive manufacturing (AM) includes various manufacturing processes, such as three-dimensional (3D) printing techniques that comprise selective sintering, directed energy deposition, metal binder jetting, powder bed fusion, or other techniques, including combinations and improvements thereof. Although various metals or other materials can be employed to manufacture injector 200, in this example injector 200 is formed from aluminum material in an additive manufacturing process. Aluminum materials can include aluminum metal, aluminum alloys, or aluminum compounds. Various materials and metal alloys might be employed other than aluminum materials. However, aluminum has several advantages for forming injector 200 and associated features. Aluminum provides improved heat transfer characteristics and lighter weight than other metals used for injectors, such as copper, stainless steels, and related high temperature alloys including Inconels.

Stubs 211-212 are formed from the same material and into the same body element as manifold 210 by additive manufacturing. A taper is included at the base of each stub where the stub meets the top face of manifold 210. Further features, such as the throat and gasket mating features are also formed using additive manufacturing. Injection face 215 is also formed from aluminum material and can be formed using additive manufacturing to form features of injection face 215, such as propellant apertures, from the same body as manifold 210 and stubs 211-212.

The additive manufacturing of various rocket engine components, such as injector 200, can expand the feasible injector geometry and minimize component count. Advantageously, a reduction in separate components can result in corresponding reduction in leaks and reliance upon joints and sealing features. The seals that remain in an engine system can comprise cryogenic O-rings, such as Teflon encapsulated stainless helical spring O-rings or Teflon encapsulated silicone O-rings, among others. These remaining seals can handle lower internal injector temperatures resulting from densified propylene in combination with LOX. Catastrophic leaks can thus be minimized or prevented using injector 200 when subject to extreme temperature environments of high-heat combustion and low-temperature cryogenic propellants. Additive manufacturing can also provide embedded volumes and cavities to position propellant channels within close proximity to high heat flux surfaces. This positioning can function as a coolant for the aluminum material of the injector face, thereby dissipating the combustion heat more effectively. Flow passages of injector 200 are sized to account for the change in density of using preconditioned/densified propylene versus ambient temperature propylene.

Figure 5:
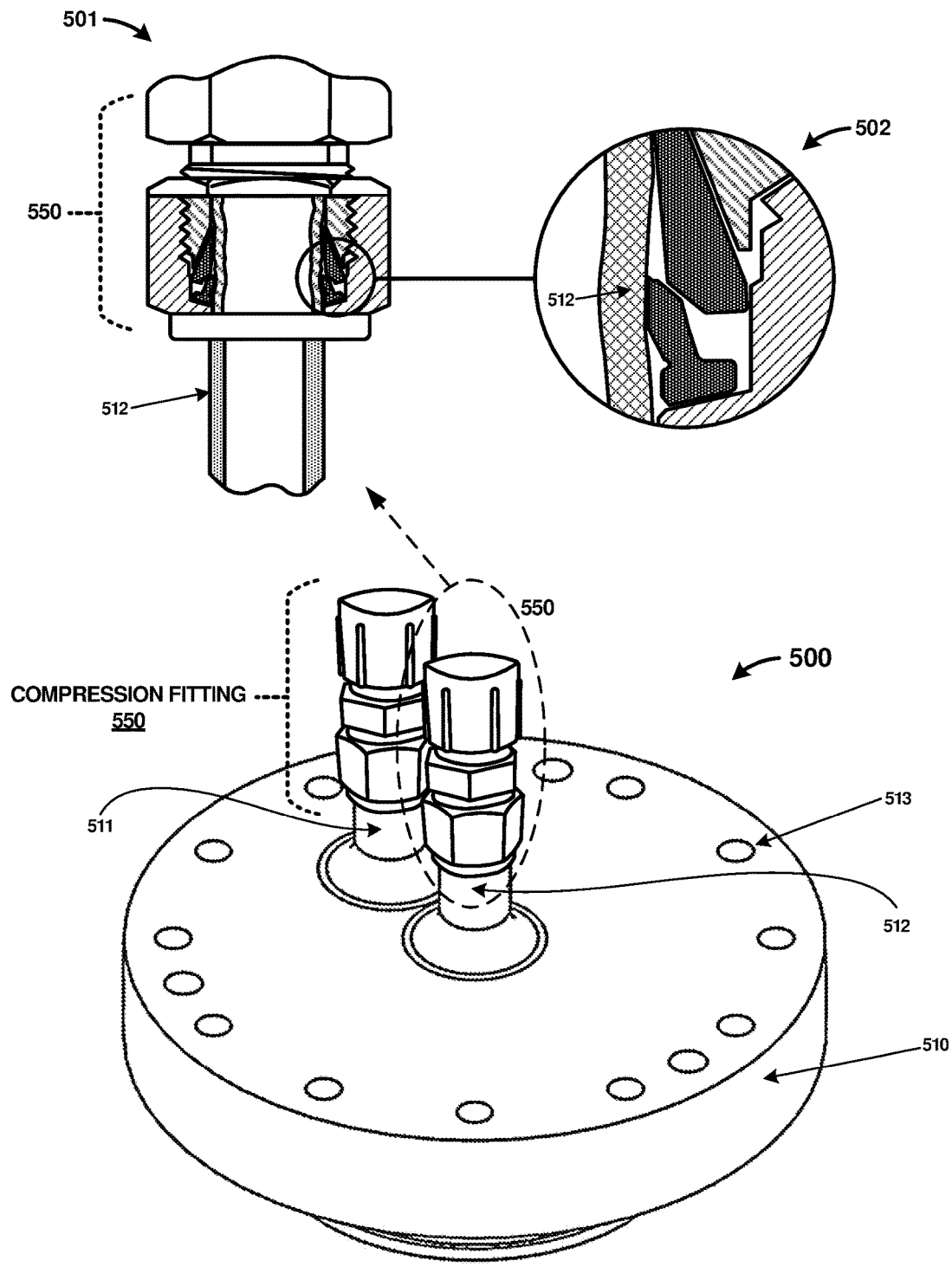
FIG. 5 illustrates an injector manifold in an implementation.

As mentioned above, stubs 211 and 212 can be formed from the same material and body as manifold 210. To interface stubs 211 and 212 to associated propellant lines, various mating techniques can be employed. Due in part to stubs 211 and 212 being formed from the same body as manifold 210 with AM techniques, various error-prone and damage-inducing methods can be prevented. FIG. 5, discussed below, includes example couplings for stubs 211-212.

Figure 3:
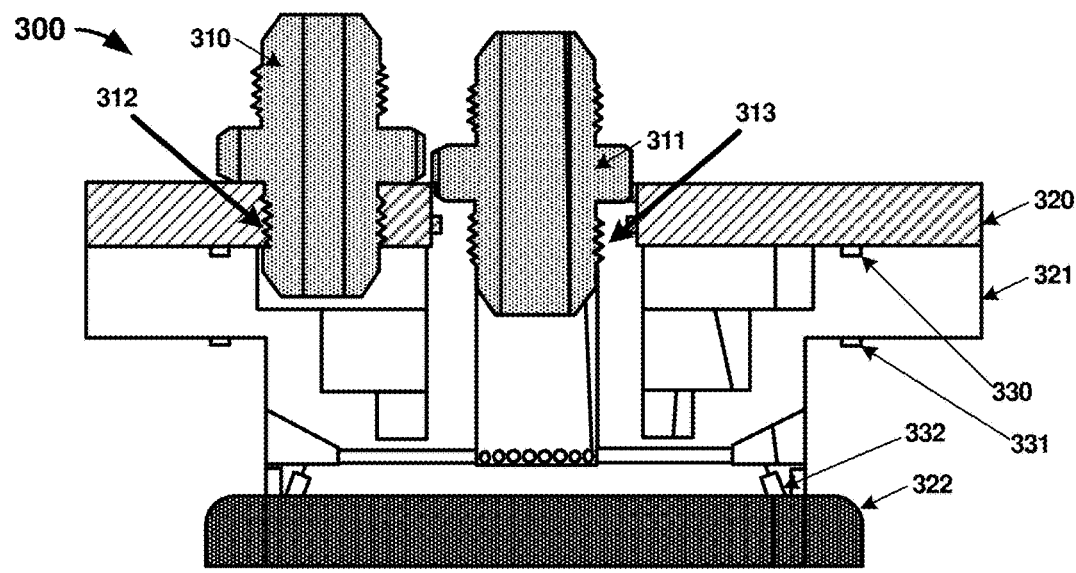
FIG. 3 illustrates an injector manifold in a previous implementation.

However, previous techniques have led to problems mating fuel and oxidizer lines to injector features. For example, FIG. 3 shows injector 300 made using non-AM techniques, such as conventional subtractive machining of a metal piece. Top plate 320 and bottom plate 321 are separately manufactured and machined and include gasket sealing features 330, 331, and 332. A separate mating plate 322 is included as well to mate to a combustion chamber. These multiple independent parts lead to usage of many individual seals and a higher probability of failure. Moreover, to interface propellant lines to injector 300, threaded connections 310-311 are employed. The process of drilling, tapping, and threading features 312-313 can lead to foreign object debris (FOD) as well as imprecisions related to the multiple manufacturing and machining steps involved. This FOD can embed into injection apertures, wetted surfaces, and other locations which can lead to inefficiencies and failures of the injector. Moreover, limitations with subtractive machining or even with casting techniques lead to non-ideal placement and sizing of cavities within injector 300. Associated sidewalls also must be made sufficiently large to accommodate harsh machining or casting environments.

FOD and other machining issues are avoided using the AM-formed stubs and compression-style fittings discussed herein. Threading, tapping, or drilling can be avoided, providing for more reliable operation of injector 500 than that shown in FIG. 3. The quantity and types of interfaces used for subtractive machining techniques typically require much larger features to contain and provide strength for the threaded surfaces and to provide the necessary surface areas for seals. These large features cause the drawback of added mass along with the associated increase cost of this extra material. Instead of compression-style fittings, welding can be employed to couple the stubs to further lines. However, welding can also add process variability that is related to the specific material being used and restricts interface combinations between dissimilar materials. Some materials, including aluminum alloys, are negatively affected by the welding process (e.g. loss of strength). Using welding to permanently interface to adjacent components can minimize leak paths, but have negative drawbacks including that the joints are not readily separable which limit serviceability and flexibility.

Figure 4:
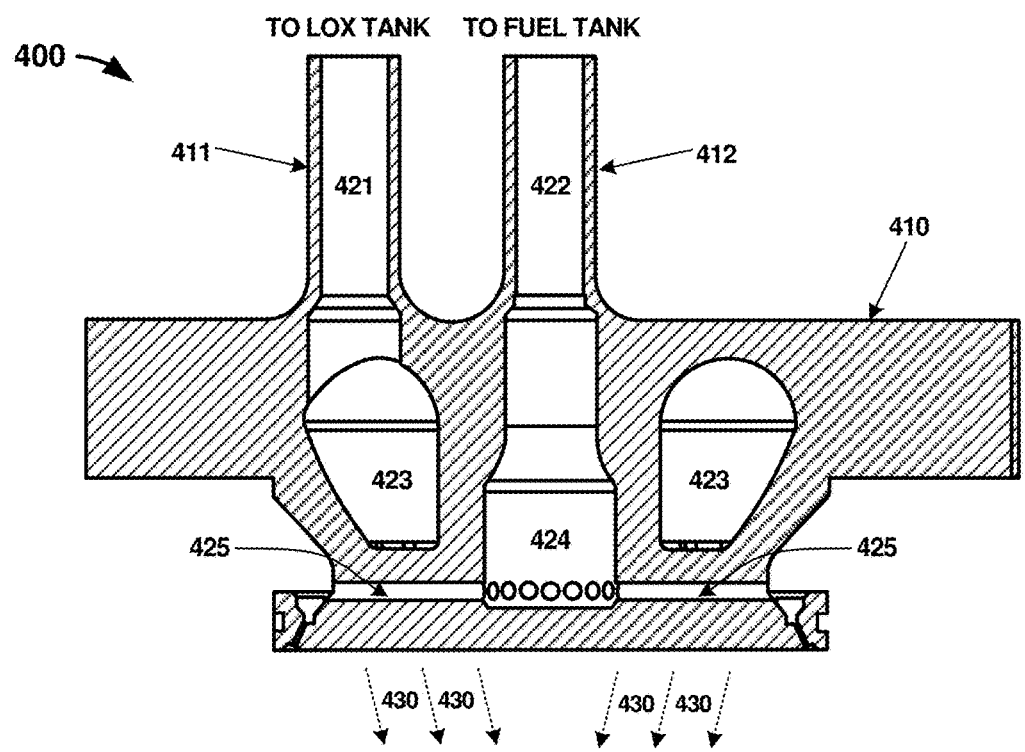
FIG. 4 illustrates an injector manifold in an implementation.

Advantageously, the enhanced injectors discussed herein, such as injector 200, can be provided which is formed using AM techniques and with built-in stubs. As a further example of enhanced injectors, FIG. 4 is presented which includes a side view cutout of injector 400. In FIG. 4, injector body 410 is formed from aluminum using AM techniques, and includes integral stubs 411-412. Internal features of stubs 411 and 412 can be seen in FIG. 4. Channel 421 is formed within stub 411, and channel 422 is formed within stub 412. Channel 421 feeds into chamber or cavity 423 which forms a quasi-toroidal shape around a central cavity 424 which is fed by channel 422. Injection face 425 is formed into body 410 which has a plurality of apertures that allow propellants within associated cavities 423 and 424 to flow out of injector 400. Directional flow arrows 430 illustrate a directional flow of propellants ejected from injector 400, and a further discussion of the apertures that produce this directional flow is included below for FIGS. 6-7. Body 410 can be mounted to structural elements of a rocket system, and injector face can employ a seal or gasket between injector face 425 and a combustion chamber. Thus, the number of seals or gaskets can be minimized in this enhanced injector due in part to the single piece/body of injector 400 and stubs 411-412

Turning now to a discussion on the coupling of stubs of an enhanced injector to fuel lines, FIG. 5 is presented. FIG. 5 illustrates metal-metal sealing features between stubs of an injector and propellant lines or other propellant feed features. Compression fitting 550 is shown in view 501 for coupling to an associated stub of injector 500. Compression fittings can employ a mechanical swaging or flaring of tube stubs 511-512 to provide metal-to-metal seals between the AM stubs and the interfacing fluid component/fittings. Injector 500 includes similar features of injector 200 and 400, such as stubs 511-512 formed using AM techniques into a same part or piece as body 510, and mounting features 513. View 502 illustrates a further detailed view of the compression fitting using deformation by compression to form a seal between stub 512 and an associated connector for a fuel line. Integral tube stubs 511-512 can have compression ferrules and captive nuts installed which then are configured to further mate with connectors of propellant lines. Example types of compression fittings include flareless fittings, flared compression fittings, single and double ferrule fittings, CPI/ A-LOK fittings, and Swagelok Two-Ferrule Tube Fittings, among other compression fittings.

Figure 6A:
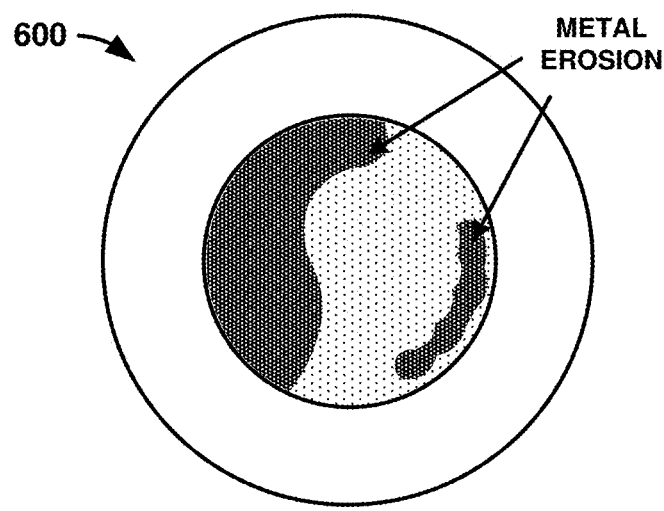
FIG. 6A illustrates an injector manifold in an implementation.
Figure 6B:
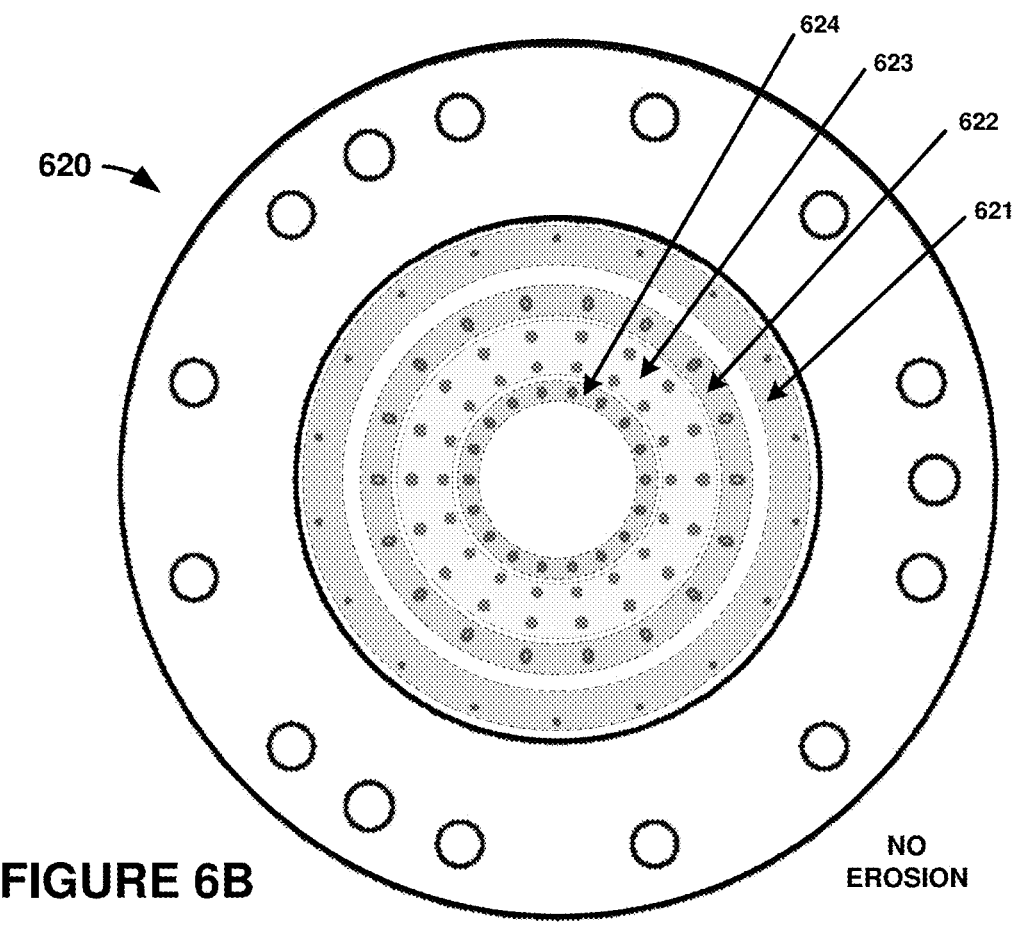
FIG. 6B illustrates an injector manifold in an implementation.

Turning now to a discussion on the enhanced injection aperture or port features of the injectors discussed herein, FIGS. 6A and 6B are provided. FIG. 6A is included to show non-optimized injection apertures in an injector 600. Metal erosion can occur around both LOX ports and propylene ports due to placement and directionality of the associated ports. Moreover, overheating of associated combustion chambers can arise from the high temperatures associated with combustion.

FIG. 6B illustrates an enhanced injector aperture configuration 620. The individual injection apertures or ports can be associated with either LOX or propylene and are fed by the respective cavity or chamber illustrated in previous figures, such as cavities 423 and 424 in FIG. 4. A "split-triplet" configuration is shown in FIG. 6B, with an inner portion 624 of a single ring of ports dedicated to fuel injection, a middle portion 623 of two-rows of ports dedicated to LOX injection, and an outer portion 622 of a single row of ports dedicated to fuel injection. A final outer portion 621 is included to inject fuel as well. Advantageously, the configuration shown in FIG. 6B provides for minimal or no erosion of the injection plate and ports over a desired lifetime of the injector.

Directionality features are also incorporated into each of the ports. Specifically, the portions 622, 623, and 624 are configured to inject associated propellant (LOX and fuel) inward with respect to a centerline of injector 620. Portion 621 is configured to inject fuel outward and towards walls of an associated combustion chamber. The enhanced injection scheme employed in injector 620 directs propellant flow towards the centerline and away from the walls of the chamber. This can establish a barrier boundary layer to form along the walls of the chamber in order to help insulate the chamber walls from the highest heat regions of combustion. Further detail on the directionality is illustrated in FIG. 7.

Figure 7:
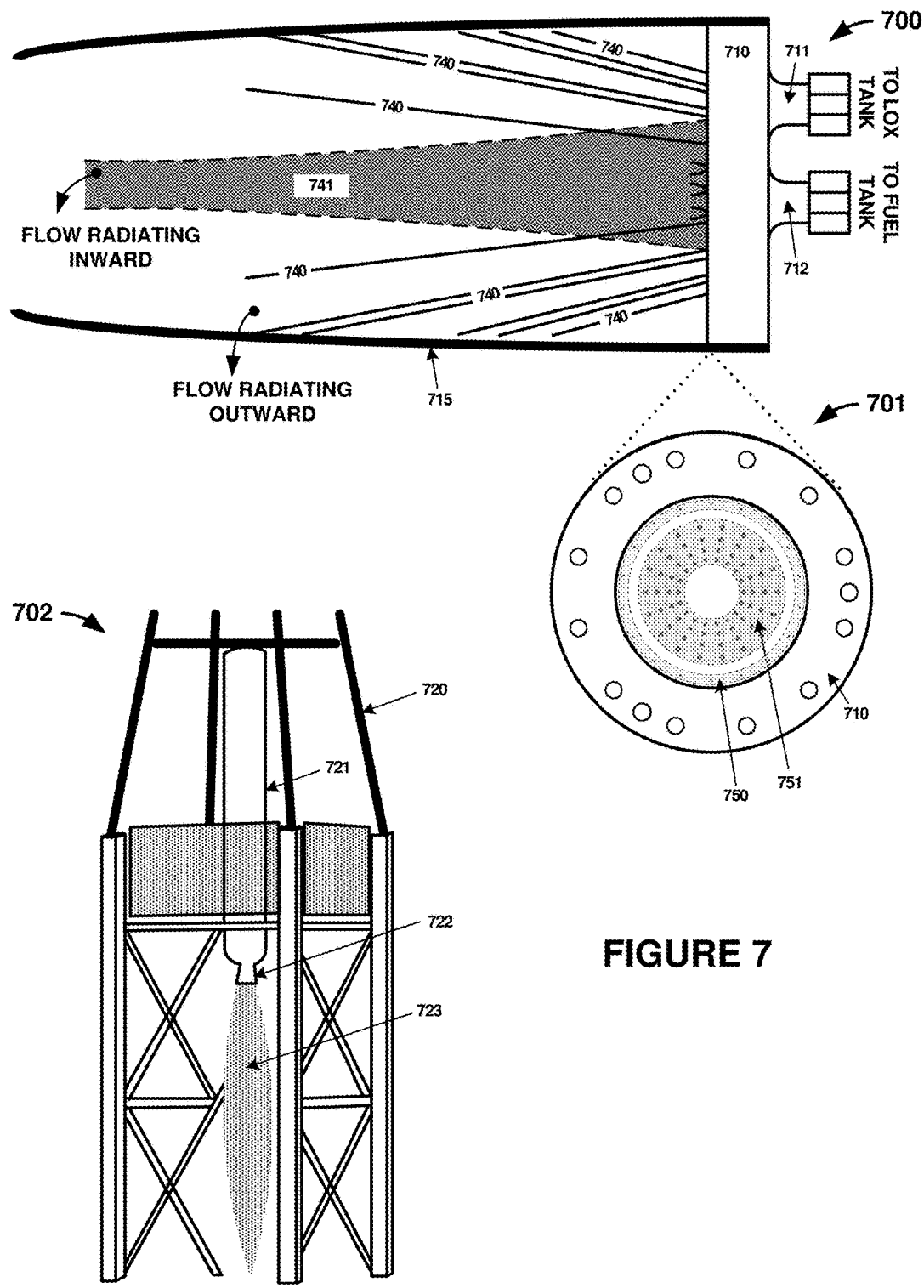
FIG. 7 illustrates rocket engine systems in an implementation.

FIG. 7 illustrates a rocket engine system in an implementation. A portion of a rocket engine system is shown in configuration 700 that includes a side view of injector 710 and a portion of chamber 715. Feed stubs 711-712 are also shown in FIG. 7 to further illustrate their associated features.

Configuration 700 is included to further illustrate the directional injection features of an enhanced injector discussed herein. For example, the inner portions 622, 623, and

624 of FIG. 6 can be employed to direct LOX and fuel into a center conical flow. The center conical flow can be described as the propellant moving towards the chamber center line. The central four rings of orifices on injector 710 (i.e. inner portions 622, 623, and 624 of injector 620) form the resultant flow 741. Configuration 701 illustrates inner rings 751 of injection orifices or apertures which corresponds to flow 741. Individual jets emerge from the face of injector 710 before hitting/merging with each other and forming the conical flow. The outwardly flowing small jets 740 can be formed from orifices formed around a perimeter of the injector face (i.e. portion 621 of injector 620) form a fuel film for cooling walls of chamber 715 by impinging on the walls of chamber 715. Configuration 701 illustrates outer ring 750 of injection orifices or apertures which corresponds to flow 740.

Configuration 702 illustrates an engine system vertically installed into test stand 720 for experimental testing of the associated engine system 721. Nozzle 722 has propellant 723 exiting for use in propulsion. The enhanced features illustrated in configurations 700 and 701 can be employed in configuration 702 to provide for a LOX/propylene engine with a high-energy release resultant from densified propylene combustion and the low-temperature environments of its cryogenic propellants.

Thus, the examples in FIGS. 6 and 7 illustrate various enhanced features of injectors and associated orifices/ports/apertures. These injector features provided for minimized damage such as injector melting, especially during start-up transients. The injector and associated enhanced features herein can be deployed in improved LOX/propylene engines with injectors that are capable of withstanding the high heat environment of due to high energy hydrocarbon combustion. Use of densified propylene is also provided herein, and injectors and injection apertures are capable of using densified propylene. Furthermore, flow passages and apertures of injectors are sized to account for the change in density of using preconditioned/densified propylene versus ambient temperature propylene.

Directionality of propellant injection into the chamber volume is provided to reduce heat flux onto the chamber walls. For example, flow momentum is angled towards a centerline of a combustion chamber to reduce heat flux from combustion onto the chamber walls. Moreover, jets of fuel are projected onto the chamber walls to establish a film or layer of fuel for cooling the chamber walls. The vaporization and other processes associated with the fuel film projected onto the chamber walls provides conductive cooling due to the cryogenic temperatures of the fuel as well as evaporative cooling from the fuel interacting with the heat of combustion in the central conical propellant injection.

Figure 8:
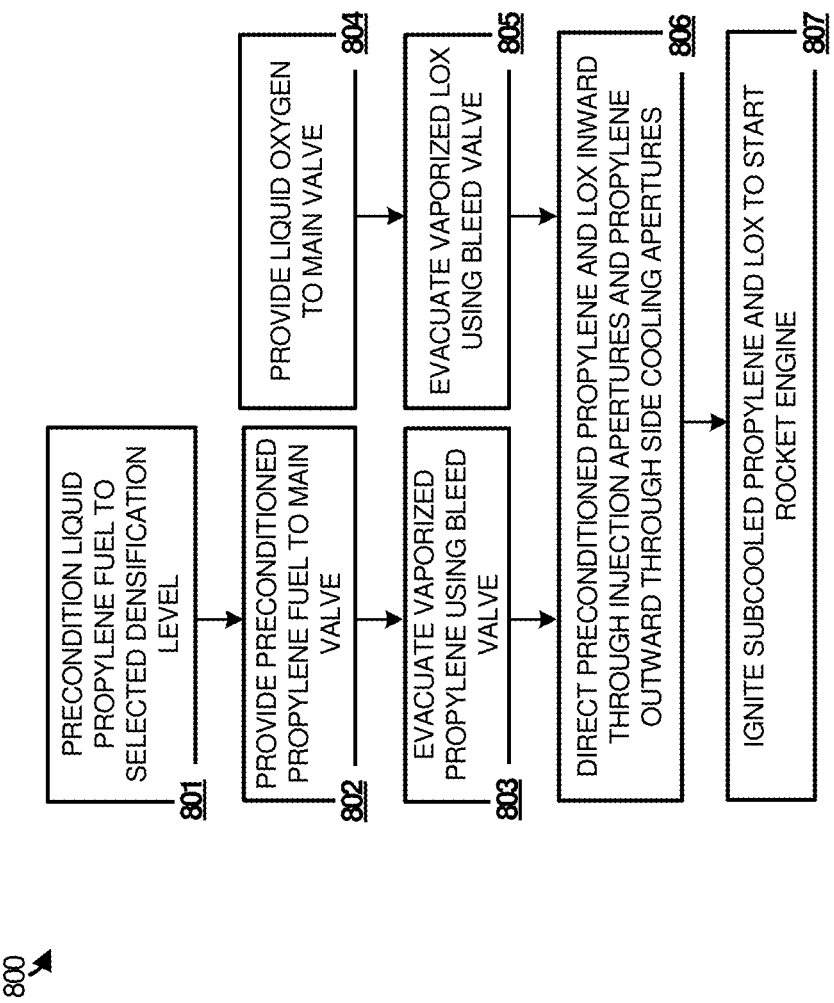
FIG. 8 illustrates a method of operating a rocket system.

To further illustrate the operation of the rocket engine systems and injection features herein, FIG. 8 is provided. FIG. 8 is a flow diagram that illustrates a method of operating a rocket system. The rocket systems employed to operate according to the descriptions in FIG. 8 can include any of the enhanced systems and elements discussed herein, such as system 100 of FIG. 1, injector 200 of FIG. 2, injector 400 of FIG. 4, injector 500 of FIG. 5, injector 620 of FIG. 6, and the configurations of FIG. 7, including combinations and variations thereof. However, for purposes of clarity, the operations of FIG. 8 will be discussed in the context of the elements of FIG. 1.

In FIG. 8, liquid propylene fuel is preconditioned to a selected densification level (801). This preconditioning includes cooling the propylene fuel using any suitable cryogenic cooling system. Both LOX and propylene propellants can be contained in associated propellant tanks 160-161 at cryogenic temperatures, and cooling systems 162-163 employed by system 100 can include associated insulation, chiller mechanisms, recirculation features, heat exchangers, or other elements. Preconditioning of the propylene (or LOX) can include a densification processes that cools the propellants below a desired temperature. The fuel may comprise densified propylene which has been cooled below ambient temperature (such as below 25° C.), or subcooled below the propylene atmospheric boiling point (below −50° C.). The densified propylene may be cooled prior to transfer to combustion chamber 110 while in or recirculating through the associated fuel tank, or may be cooled prior to loading into the associated tank.

System 100 provides (802) preconditioned propylene to fuel main valve 122, and provides (804) liquid oxygen to LOX main valve 121. In FIG. 1, fuel line 127 and LOX line 126 provide associated propellants to main valves 121-122. However, vapor or gas bubbles can form in propellant lines due to contact of the propellants with materials of the propellant lines, the distances or lengths of the propellant lines, the temperature of the environment surrounding system 100, or timeframes involved in storage of the cryogenic propellants, among other vapor-forming events. These gas bubbles or volumes of vapor can lead to damage to engine system 100 during startup and ignition.

During engine start-up, the high vapor pressure of the propylene and the cryogenic temperature of propellants can cause the initial flows into injector assembly 130 to be a complex and dynamic multi-phase process. Both propellants first gasify while the injector elements cool down and manifold and chamber pressures rise. During this transient period, critical parameters such as combustion temperature, injector face cooling, and chamber film cooling flow rates are more sensitive to exceeding acceptable operating ranges if boundary conditions are off-nominal, in part because of the propylene high-energy carbon double bond noted previously. It has also been found that gas bubbles can form in the propellant feed lines ahead of the injector main valves during terminal count, which in turn extends the initial gas flow phase at start up and increases the heating rates of the injector surface. In addition, if, during steady-state combustion, the engine were to run at chamber pressures below the vapor pressure of the propylene, the latter will cavitate (gasify) within the injector manifold and flow passages, again restricting mass flow and inducing severe off-nominal combustion behavior. This is most relevant to applications featuring blow-down tank pressurization systems, such as launch vehicle upper stages. At a minimum, this phenomenon can significantly reduce engine performance and under extreme conditions lead to damage of the engine injector and/or the chamber.

To prevent damage to engine system 100, bleed valve 125 is included to evacuate vaporized propylene (803), and bleed valve 124 is used to evacuate vaporized LOX (805). Bleed valves 124-125 may be manually-operated or remotely operated valves mounted to the engine and interface just upstream of the primary seal of the main valves. Bleed valves 124-125 may comprise electronically, hydraulically, or pneumatically-actuated valves. Bleed valves 124-125 assist in usage of preconditioned propellant to reduce or eliminate gas content in propellant lines during start-up when the propellant flows into the injector. Evacuation of gas content in the propellant lines can provide cold propellant at the inlet to main valves 121-122, and enable longer and more complex feed systems that comprise lines 126-127. For example, longer propellant lines for both fuel and oxidizer can be employed without increasing the risk of damage during engine start-up while making the engine compatible with thrust vector control elements.

Once the gas content in the propellant lines has been bled using bleed valves 124-125, engine system 100 directs (806) preconditioned propylene and lox inward through injection apertures and propylene outward through side cooling apertures (806), and an associated igniter then ignites the subcooled propylene and lox to start rocket engine (807). In FIG. 1, injector assembly 130 is employed to inject propellant into chamber 110. Various apertures or orifices are provided in injector assembly 130, such as those shown in FIGS. 6B and 7, to direct the LOX and a portion of the fuel into a central conical flow indicated by directional arrows 133 in FIG. 1. A second portion of fuel is directed toward walls of chamber 110 through apertures dedicated to cooling the chamber walls with cryogenic fuel, as indicated by directional arrows 134 in FIG. 1. Thus, FIG. 1 illustrates a layered combustion profile, with a barrier layer 112 formed from impinging cryogenic fuel onto the walls of chamber 110. Combustion zone 113 comprises a volume where fuel and LOX are combined and combusting, while zone 114 indicates the exit of combusting and combusted propellants out of nozzle 111.

Certain inventive aspects may be appreciated from the foregoing disclosure, of which the following are various examples.

Example 1

A rocket engine propellant injection apparatus, comprising an injector assembly formed into a single body by an additive manufacturing process. The injector assembly comprising a fuel cavity, an oxidizer cavity, and one or more propellant feed stubs protruding from the injector assembly and formed into the single body of the injector assembly by the additive manufacturing process, with at least a first stub configured to carry fuel to the fuel cavity and at least a second stub configured to carry oxidizer to the oxidizer cavity. The injector assembly including a plurality of injection features comprising apertures in a face of the injector assembly, ones of the plurality of injection features configured to inject the fuel and the oxidizer for combustion.

Example 2

The apparatus of Example 1, comprising the injector assembly comprising an aluminum material that forms the single body by the additive manufacturing process.

Example 3

The apparatus of Examples 1-2, where the rocket engine propellant injection apparatus is configured to employ densified propylene as the fuel and liquid oxygen as the oxidizer.

Example 4

The apparatus of Examples 1-3, comprising the one or more propellant feed stubs forming tube structures tapered outwards from a first face of the injector assembly and configured to mate with compression-type fittings for attachment to associated propellant feed lines.

Example 5

The apparatus of Examples 1-4, comprising the plurality of injection features formed into the single body by the additive manufacturing process.

Example 6

The apparatus of Examples 1-5, comprising the plurality of injection features comprising a first portion of orifices configured to inject fuel and oxidizer in a generally conical shape directed inward with respect to an associated combustion chamber wall.

Example 7

The apparatus of Examples 1-6, comprising the plurality of injection features comprising a second portion of orifices configured to inject fuel directed outward at the associated combustion chamber wall for cooling of the associated combustion chamber wall.

Example 8

A liquid rocket engine, comprising a combustion chamber configured to receive liquid oxygen and liquid propylene for combustion, a first propellant feed line configured to carry the liquid oxygen from a first propellant tank to a first main valve, a second propellant feed line configured to carry the liquid propylene from a second propellant tank to a second main valve, and an injector assembly configured to receive the liquid oxygen and the liquid propylene from associated ones of the first and second main valves and inject the liquid oxygen and the liquid propylene into the combustion chamber. The injector assembly formed into a single body by an additive manufacturing process and comprising a fuel cavity, an oxidizer cavity, and one or more propellant feed stubs protruding from the injector assembly and formed into the single body of the injector assembly by the additive manufacturing process, with at least a first stub configured to carry the liquid propylene to the fuel cavity and at least a second stub configured to carry the liquid oxygen to the oxidizer cavity. The injector assembly further comprising a plurality of injection features comprising apertures in a face of the injector assembly, ones of the plurality of injection features configured to inject the liquid oxygen and the liquid propylene into the combustion chamber for combustion.

Example 9

The liquid rocket engine of Example 8, comprising the injector assembly comprising an aluminum material that forms the single body by the additive manufacturing process.

Example 10

The liquid rocket engine of Examples 8-9, where the liquid propylene comprises densified propylene cooled below at least one of an ambient temperature and an atmospheric boiling point of propylene.

Example 11

The liquid rocket engine of Examples 8-10, comprising the one or more propellant feed stubs forming tube structures outwards from a first face of the injector assembly, the first face opposite a face of the injector assembly comprising the plurality of injection features.

Example 12

The liquid rocket engine of Examples 8-11, comprising the one or more propellant feed stubs configured to mate with compression-type fittings for attachment to associated propellant feed lines routed from the associated ones of the first and second main valves.

Example 13

The liquid rocket engine of Examples 8-12, comprising the plurality of injection features formed into the single body by the additive manufacturing process, and comprising a first portion of orifices configured to inject fuel and oxidizer in a generally conical shape directed towards a centerline of the combustion chamber.

Example 14

The liquid rocket engine of Examples 8-13, comprising the plurality of injection features comprising a second portion of orifices configured to inject fuel directed outward at a wall of the combustion chamber for cooling of the wall of the combustion chamber.

Example 15

The liquid rocket engine of Examples 8-14, comprising a first bleed valve coupled to the first propellant feed line before the first main valve and configured to selectively evacuate at least a portion of vaporized liquid oxygen within the first propellant feed line, and a second bleed valve coupled to the second propellant feed line before the second main valve and configured to selectively evacuate at least a portion of vaporized liquid propylene within the second propellant feed line.

Example 16

The liquid rocket engine of Examples 8-15, comprising a first propellant tank configured to store the liquid oxygen in a cryogenic state prior to ignition of the liquid rocket engine, and a second propellant tank configured to store the liquid propylene in a densified state prior to the ignition of the liquid rocket engine.

Example 17

A method of manufacturing a rocket engine propellant injection apparatus. The method comprising forming an injector assembly into single body by an additive manufacturing process, where the single body of the injector assembly comprises a fuel cavity and an oxidizer cavity. The method includes forming at least a first propellant feed stub into the single body by the additive manufacturing process to provide a first channel to carry fuel to the fuel cavity, forming at least a second propellant feed stub into the single body by the additive manufacturing process to provide a second channel to carry oxidizer to the oxidizer cavity, and forming a plurality of propellant injection features into the single body by the additive manufacturing process comprising apertures in a face of the injector assembly.

Example 18

The method of Example 17, further comprising forming the injector assembly into the single body using an aluminum material in the additive manufacturing process.

Example 19

The method of Examples 17-18, further comprising attaching a first compression fitting to the first propellant feed stub and a second compression fitting to the second propellant feed stub, the first and second compression fittings configured to couple to associated propellant lines.

Example 20

The method of Examples 17-19, further comprising forming the plurality of injection features to include a first portion of directional orifices configured to inject fuel and oxidizer in a generally conical shape directed towards a centerline of a combustion chamber, and a second portion of directional orifices configured to inject fuel directed outward at a wall of the combustion chamber.

Example 21

A method of providing propellant to a combustion chamber of a rocket engine. The method comprising preconditioning liquid propylene into a densified state and providing densified propylene to a fuel tank associated with the rocket engine, providing liquid oxygen to an oxidizer tank associated with the rocket engine, purging vaporized densified propylene from one or more fuel feed lines that provide the densified propylene from the fuel tank to a fuel valve of the rocket engine, and purging vaporized liquid oxygen from one or more oxidizer feed lines that provide the liquid oxygen from the oxidizer tank to an oxidizer valve of the rocket engine. The method also includes engaging the fuel valve to provide the densified propylene to an injector assembly, engaging the oxidizer valve to provide the liquid oxygen to the injector assembly, injecting the densified propylene and the liquid oxygen from apertures in the injector assembly into a combustion chamber of the rocket engine, and igniting the densified propylene and the liquid oxygen within the combustion chamber to provide propulsion associated with the rocket engine.

Example 22

The method of Example 21, where preconditioning the liquid propylene comprises cooling the liquid propylene below an ambient temperature.

Example 23

The method of Examples 21-22, where preconditioning the liquid propylene comprises sub-cooling the liquid propylene below an atmospheric boiling point of the liquid propylene.

Example 24

The method of Examples 21-23, comprising purging the vaporized densified propylene using one or more fuel bleed valves, and purging the vaporized liquid oxygen using one or more oxidizer bleed valves.

Example 25

The method of Examples 21-24, comprising injecting the liquid oxygen and at least a first portion of the densified propylene from a first portion of the apertures in the injection assembly in a generally conical shape directed towards a centerline of the combustion chamber.

Example 26

The method of Examples 21-25, comprising injecting at least a second portion of the densified propylene from a second portion of the apertures in the injection assembly directed outward at a wall of the combustion chamber for cooling of the wall of the combustion chamber.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials, manufacturing processes, and propellants discussed herein are employed according to the descriptions above. However, it should be understood that the disclosures and enhancements herein are not limited to these materials, manufacturing processes, and propellants, and can be applicable across a range of suitable materials, manufacturing processes, and propellants. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A rocket engine injector apparatus, comprising:
an injector body formed by an additive manufacturing process;
a fuel cavity in the injector body;
an oxidizer cavity that forms a quasi-toroidal shape around the fuel cavity;
feed stubs formed into the injector body by the additive manufacturing process, the feed stubs comprising tube structures projecting outwards from a first face of the injector body and having swaged or flared features to mate with compression-type fittings in a metal-to-metal seal for attachment to associated feed lines;
wherein at least a first feed stub of the feed stubs extends outward from a first position on the first face of the injector body and is configured to carry fuel through a first channel to the fuel cavity;
wherein at least a second feed stub of the feed stubs extends outward from the first face of the injector body in a position offset from the first position and is configured to carry oxidizer through a second channel to the oxidizer cavity; and
a plurality of injection apertures in a second face of the injector body opposite the first face of the injector body configured to inject the fuel and the oxidizer for combustion, with each of the fuel cavity and the oxidizer cavity feeding a corresponding subset of the plurality of injection apertures.

2. The apparatus of claim 1, wherein flow passages of at least the injector body are sized to account for densified propylene as the fuel and liquid oxygen as the oxidizer.

3. The apparatus of claim 2, wherein the density of the densified propylene corresponds to propylene subcooled below an atmospheric boiling point of propylene.

4. The apparatus of claim 1, comprising:
the injector body comprising an aluminum material that forms a single body by the additive manufacturing process.

5. The apparatus of claim 1, comprising:
the plurality of injection apertures formed into the injector body by the additive manufacturing process.

6. The apparatus of claim 1, comprising:
the plurality of injection apertures comprising a first portion configured to inject fuel and oxidizer in a generally conical shape directed inward with respect to an associated combustion chamber wall.

7. The apparatus of claim 6, comprising:
the plurality of injection apertures comprising a second portion configured to inject fuel directed outward at the associated combustion chamber wall for cooling of the associated combustion chamber wall.

8. A rocket engine, comprising:
a combustion chamber configured to receive liquid oxygen and liquid propylene;
a first feed line configured to carry the liquid oxygen from a first tank to a first main valve;
a second feed line configured to carry the liquid propylene from a second tank to a second main valve; and
an injector assembly configured to receive the liquid oxygen and the liquid propylene from associated ones of the first and second main valves and inject the liquid oxygen and the liquid propylene into the combustion chamber, the injector assembly formed into a body by an additive manufacturing process and comprising:
a fuel cavity;
an oxidizer cavity that forms a quasi-toroidal shape around the fuel cavity;
feed stubs forming tube structures tapered outwards from a first face of the injector assembly and formed into the body of the injector assembly by the additive manufacturing process, wherein the feed stubs are each mechanically swaged or flared to mate with a compression-type fitting in a metal-to-metal seal for attachment to an associated feed line routed from the associated ones of the first and second main valves;
wherein at least a first stub extends outward from a first position on the first face of the injector assembly and is configured to carry the liquid propylene to the fuel cavity;
wherein at least a second stub extends outward from the first face of the injector assembly in a position offset from the first position and is configured to carry the liquid oxygen to the oxidizer cavity; and
injection apertures in a second face of the injector assembly opposite the first face of the injector assembly, each of the fuel cavity and the oxidizer cavity feeding a corresponding subset of the injection apertures, with corresponding ones of the injection apertures configured to inject the liquid oxygen and the liquid propylene into the combustion chamber for combustion.

9. The rocket engine of claim 8, wherein flow passages of at least the injector assembly are sized to account for densified liquid propylene as a fuel and the liquid oxygen as an oxidizer.

10. The rocket engine of claim 9, wherein the density of the densified liquid propylene corresponds to the liquid propylene subcooled below an atmospheric boiling point of propylene.

11. The rocket engine of claim 8, comprising:
the injector assembly comprising an aluminum material that forms a single body by the additive manufacturing process.

12. The rocket engine of claim 8, comprising:
the injection apertures formed into a single body by the additive manufacturing process, and comprising a first portion configured to inject fuel and oxidizer in a generally conical shape directed towards a centerline of the combustion chamber.

13. The rocket engine of claim 12, comprising:
the injection apertures comprising a second portion configured to inject fuel directed outward at a wall of the combustion chamber for cooling of the wall of the combustion chamber.

14. The rocket engine of claim 8, comprising:
a first bleed valve coupled to the first feed line before the first main valve and configured to selectively evacuate at least a portion of vaporized liquid oxygen within the first feed line; and
a second bleed valve coupled to the second feed line before the second main valve and configured to selectively evacuate at least a portion of vaporized liquid propylene within the second feed line.

15. The rocket engine of claim 8, comprising:
a first tank configured to store the liquid oxygen in a cryogenic state prior to ignition of the rocket engine; and
a second tank configured to store the liquid propylene in a densified state prior to the ignition of the rocket engine.

16. A method comprising:
forming an injector assembly for a rocket engine into a body by an additive manufacturing process, wherein the body of the injector assembly comprises a fuel cavity and an oxidizer cavity that forms a quasi-toroidal shape around the fuel cavity;
forming at least a first feed stub into a first face of the body and tapering outwards from a central position on the first face of the body by the additive manufacturing process to provide a first channel to carry fuel to the fuel cavity;
forming at least a second feed stub into the first face of the body and tapering outwards from a position offset from the central position on the first face of the body by the additive manufacturing process to provide a second channel to carry oxidizer to the oxidizer cavity;
forming propellant injection features into the body by the additive manufacturing process in a second face of the injector assembly opposite the first face of the injector assembly; and
attaching a first compression fitting to the first feed stub and a second compression fitting to the second feed stub in a metal-to-metal seal, the first and second compression fittings each mechanically swaged or flared to couple to associated propellant lines.

17. The method of claim 16, further comprising:
sizing flow passages of the injector assembly to account for a change in density of using liquid propylene as the fuel and liquid oxygen as the oxidizer.

18. The method of claim 17, wherein the liquid propylene comprises densified propylene subcooled below an atmospheric boiling point of propylene.

19. The method of claim 16, further comprising:
forming the injector assembly into the body using an aluminum material in the additive manufacturing process.

20. The method of claim 16, further comprising:
forming the propellant injection features to include first orifices configured to inject fuel and oxidizer in a generally conical shape directed towards a centerline of a combustion chamber, and second orifices configured to inject fuel directed outward at a wall of the combustion chamber.

21. An apparatus, comprising:
a single injector body formed from an aluminum material by an additive manufacturing process and having flow passages sized to account for densified propylene cooled below 25° C. as a fuel and liquid oxygen as an oxidizer;
a fuel cavity in the single injector body;
an oxidizer cavity that forms a quasi-toroidal shape around the fuel cavity;
feed stubs formed into the single injector body by the additive manufacturing process, the feed stubs comprising tube structures projecting outwards from a first face of the single injector body and having swaged or flared features to mate with compression-type fittings in a metal-to-metal seal for attachment to associated feed lines;
wherein at least a first feed stub of the feed stubs extends outward from a first position on the first face of the single injector body and is configured to carry the fuel through a first channel to the fuel cavity;
wherein at least a second feed stub of the feed stubs extends outward from the first face of the single injector body in a position offset from the first position and is configured to carry the oxidizer through a second channel to the oxidizer cavity; and
a plurality of injection apertures formed by the additive manufacturing process into a second face of the single injector body opposite the first face of the single injector body, the plurality of injection apertures configured to inject the fuel and the oxidizer for combustion, with each of the fuel cavity and the oxidizer cavity feeding a corresponding subset of the plurality of injection apertures.

22. A rocket engine, comprising:
a combustion chamber configured to receive liquid oxygen and liquid propylene;
a first feed line configured to carry the liquid oxygen from a first tank to a first main valve;
a second feed line configured to carry the liquid propylene from a second tank to a second main valve; and
an injector assembly configured to receive the liquid oxygen and the liquid propylene from associated ones of the first and second main valves and inject the liquid oxygen and the liquid propylene into the combustion chamber, the injector assembly formed into a body by an additive manufacturing process, the body having flow passages sized to account for densified propylene cooled below 25° C. as a fuel and liquid oxygen as an oxidizer, and comprising:

a fuel cavity;

an oxidizer cavity that forms a quasi-toroidal shape around the fuel cavity;

feed stubs forming tube structures tapered outwards from a first face of the injector assembly and formed into the body of the injector assembly by the additive manufacturing process, wherein the feed stubs are each mechanically swaged or flared to mate with a compression-type fitting in a metal-to-metal seal for attachment to an associated feed line routed from the associated ones of the first and second main valves;

wherein at least a first stub extends outward from a first position on the first face of the injector assembly and is configured to carry the liquid propylene to the fuel cavity;

wherein at least a second stub extends outward from the first face of the injector assembly in a position offset from the first position and is configured to carry the liquid oxygen to the oxidizer cavity; and injection apertures formed by the additive manufacturing process into in a second face of the injector assembly opposite the first face of the injector assembly, each of the fuel cavity and the oxidizer cavity feeding a corresponding subset of the injection apertures, with corresponding ones of the injection apertures configured to inject the liquid oxygen and the liquid propylene into the combustion chamber for combustion.

* * * * *